Oct. 27, 1936.  L. RIVIER  2,059,033
CINEMATOGRAPHIC PROJECTOR
Filed Oct. 27, 1934
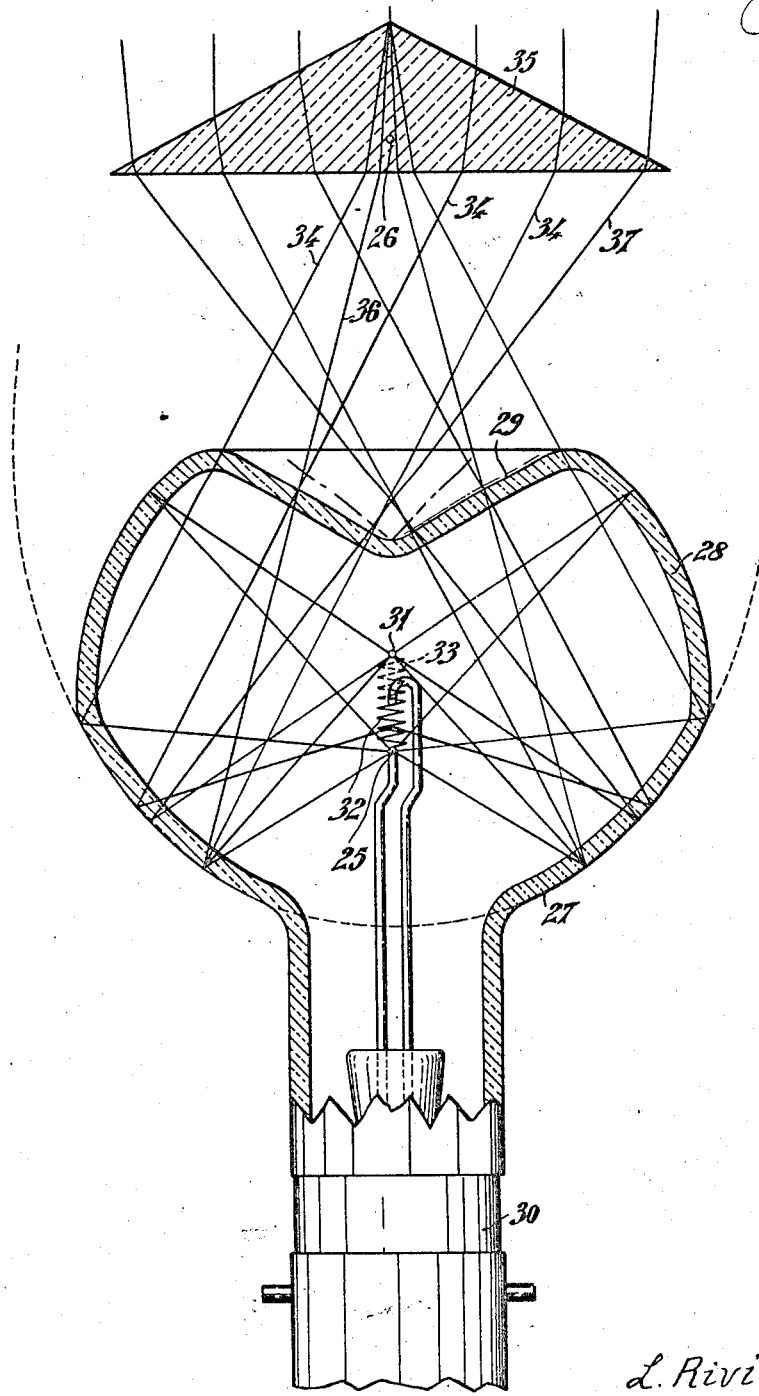

Patented Oct. 27, 1936

2,059,033

UNITED STATES PATENT OFFICE 2,059,033

CINEMATOGRAPHIC PROJECTOR

Louis Rivier, Jouxtens-Mezery, Switzerland

Application October 27, 1934, Serial No. 750,361
In Switzerland February 22, 1933

7 Claims. (Cl. 88—24)

This invention relates to cinematographic projectors of the type having a light source combined with a condenser and one or several light reflectors.

The principal object of the invention is the provision of a cinematographic projector of high efficiency. The invention consists in a cinematographic projector having an optical condenser which comprises a cone-shaped member of refractive and transparent material placed in the path of the luminous flux reflected by a light reflector formed by a surface of revolution, said cone-shaped member having its axis coinciding with the axis of the reflecting surface of revolution.

The accompanying drawing represents by way of example an axial section through a light projector according to the invention.

The represented projector comprises two reflecting surfaces 27 and 28 formed by fragmentary ellipsoids of revolution, and a prismatic body of revolution or cone 35 disposed so as to receive the rays reflected by the two reflecting surfaces. These surfaces are represented as forming a portion of a light bulb 30 having an incandescent filament 32. The reflectors could however be formed distinct of the bulb which would then be an ordinary transparent light bulb.

The inwardly bulged portion 29 of the bulb is transparent and the two reflecting surfaces 27 and 28 are facing each other. The reflector 27 has a great focal distance, its proximate focus being at 25 and its remote focus at 26, while the reflector 28 has one focus at 31 and the other also at 25 coinciding with the proximate focus of the reflector 27. Rays emitted by a luminous point situated in the focus 25 will be reflected by the reflector 27 to converge to the focus 26, and by the reflector 28 to converge to the focus 31.

When a light source 32 is placed intermediate the two foci 25 and 31, it will be axially exfocalized relative to the common focus 25 of the two reflectors.

A real image of the source 32 will be formed in 33 by reflection of the rays by the ellipsoid 28. The ellipsoid 27 receives therefore rays from a light source having twice the length of the actual source 32, the rays which are concentrated through 33 continuing their path to impinge on the reflector 27. Some of these rays will be reflected in parallel directions by different points of the reflector 27. Any vertical plane containing the axis of the device will thus contain a band of parallel rays and the lamp as a whole reflects a luminous flux in the shape of a hollow cone having a wall of a certain depth. A glass cone 35 the axis of which coincides with that of the reflectors can be placed in the path of the reflected light, and when the position of the cone along the axis, its angle and the refractive power of the glass are suitably chosen, the reflected luminous cone can be transformed into a parallel cylindrical beam without showing a tube of shadow in its center. The parallel inclined rays 34 are deviated by the cone 35 so as to become parallel to the axis after refraction. The rays 36 and 37 which deviate from the parallel rays 34 are also refracted by the cone 35 and deviate less from the axis after refraction than before.

The device described can be used for projection purposes and particularly in cinematographic apparatus. When a convergent lens is placed above the cone 35, the light beam may be concentrated to the focus of an objective lens.

In order to avoid an aberration of the parallel rays when traversing the glass of the bulb, the portion 29 of the bulb will be made to extend at right angles to the ray 34.

The described device is more advantageous than a lamp with an ordinary condenser, since the light beam which will be directed towards the condenser forms a much smaller angle with the axis than the light beam of known lamps where the beam is reflected under a solid angle of about $2\pi(1-\cos 45°)$. The luminous recuperation obtained with a condenser can therefore be about ten times greater with the described device than with ordinary lamps.

It is also seen that in all described examples, the rays emitted by the light source impinge on the reflectors at a small angle of incidence whereby the efficiency of the lamp is increased, independently of the fact that the captured flux forms an extremely large portion of the total flux of the light source.

I claim:—

1. In a cinematographic projector, the combination of a lamp bulb forming a body of revolution, a body portion of the bulb forming two elliptically sectioned reflecting zones facing each other, one focus of each reflecting zone being situated at a common point within the bulb, the second focus of each reflecting zone being situated on the axis of revolution of the bulb, one of said second foci being situated outside of the bulb and the other second focus being situated within the bulb and between said common point and the focus outside of the bulb, a filament extending from said common point along the axis of revolution towards the second focus within the bulb, and a transparent refracting member having the shape of an entire cone placed outside of the bulb in the path of the reflected light rays and in proximity to said focus situated outside of the bulb, the axis of said cone coinciding with the axis of revolution of the bulb and the base of the cone facing the bulb.

2. In a light projecting device, the combination of an elliptically sectioned reflector having a reflecting surface in the shape of an annular zone, a light source placed in the axis of the elliptical reflector and in proximity of that focus thereof situated close to reflecting surface, whereby light rays emitted by said source are reflected by the annular reflecting surface as a beam having the shape of a hollow cone, the vertex of which is situated in the region of the second focus of the reflector, and a transparent light refracting member having the shape of an entire solid cone situated in front of the reflector in the path of the reflected beam and in the region of the second focus of the reflector, the axis of said cone-shaped refracting member coinciding with the axis of the reflector, the angle at the vertex of the light refracting member being determined in accordance with the refractive power of the material of said member and with the angle of inclination of certain rays of the reflected beam of light relative to the axis whereby said rays form a substantially cylindrical solid beam of light after passage of the reflected beam across said refracting member.

3. In a light projecting device, the combination of an elliptically sectioned reflector having a reflecting surface in the shape of an annular zone, a light source placed in the axis of the elliptical reflector and in proximity of that focus thereof situated close to the reflecting surface, whereby light rays emitted by said source are reflected by the annular reflecting surface as a beam having the shape of a hollow cone, the vertex of which is situated in the region of the second focus of the reflector, and a transparent light refracting member having the shape of an entire solid cone situated in front of the reflector in the path of the reflected beam and in the region of the second focus of the reflector, the axis of said cone-shaped refracting member coinciding with the axis of the reflector and the base of said member facing the reflector, the angle at the vertex of the light refracting member being determined in accordance with the refractive power of the material of said member and with the angle of inclination of certain rays of the reflected beam of light relative to the axis whereby said rays form a substantially cylindrical solid beam of light after passage of the reflected beam across said refracting member.

4. In a light projecting device, the combination of two elliptically sectioned annular reflecting zones facing each other, and having a common axis, one focus of each reflecting zone being situated at a common point between the two zones, the second focus of each reflecting zone being situated on said common axis, one of said second foci being situated outside of the two reflecting zones and the other second focus being situated between the two zones and between said common point and the focus outside of the two zones, a light source situated on the axis of the reflecting zones and in proximity of said common point, and a transparent light refracting member having the shape of an entire solid cone placed in the path of the reflected light rays and in proximity to said focus situated outside of the two reflecting zones, the axis of said cone coinciding with the axis of said two zones and the base of the cone facing the bulb.

5. In a light projecting device, the combination of a lamp bulb having a body portion forming an elliptically sectioned annular reflecting zone, one focus of the reflecting zone being situated within the bulb and the second focus being situated outside of the bulb, a filament situated in the axis of the elliptical reflector and in proximity to said focus within the bulb whereby light rays emitted by said filament are reflected by the annular reflecting surface as a beam having the shape of a hollow cone the vertex of which is situated in the region of said second focus outside of the bulb, and a transparent light refracting member having the shape of an entire solid cone situated outside of the bulb in the path of the reflected beam and in the region of said second focus, the axis of said cone-shaped refracting member coinciding with the axis of the reflector, the angle at the vertex of the refracting member, the refractive power of the material of this member and the position of the member with respect to the second focus of the reflecting surface being such that a portion of the light rays of said reflected beam is transformed by said refracting member into a substantially cylindrical solid light beam having its axis coinciding with the axis of the reflector.

6. In a light projecting device, the combination of an elliptically sectioned reflector having a reflecting surface in the shape of an annular zone, a light source situated near the proximate focus of the reflecting surface whereby light rays emitted by said source are reflected by said annular zone as a beam having the shape of a hollow cone the vertex of which is situated in the region of the remote focus of the reflector, and a light refracting cone-shaped member situated in the region of the remote focus of the reflector and having its axis coinciding with the axis of the reflector and its base facing the reflector, said refracting member having a refractive power and being positioned with respect to said reflected beam so as to refract a portion of the rays of said beam in the shape of a substantially cylindrical solid beam of light having its axis coinciding with the axis of the reflector.

7. In a light projecting device, the combination of an elliptically sectioned reflector having a reflecting surface in the shape of an annular zone, a light source situated near the proximate focus of the reflecting surface whereby light rays emitted by said source are reflected by said annular zone as a beam having the shape of a hollow cone the vertex of which is situated in the region of the remote focus of the reflector, and a light refracting cone-shaped member situated in the region of the remote focus of the reflector and having its axis coinciding with the axis of the reflector and its base facing the reflector, said light refracting member being positioned relative to said remote focus in accordance with the refractive power of said member and with the angle of inclination of certain light rays of said reflected light beam relative to the axis of the reflector so as to refract said rays in a substantially cylindrical, solid light beam having its axis coinciding with the axis of the reflector.

LOUIS RIVIER.